(12) United States Patent
Laurini

(10) Patent No.: US 9,746,103 B2
(45) Date of Patent: Aug. 29, 2017

(54) PIPE LAYING MACHINE AND PIPE LAYING METHOD

(71) Applicant: LAURINI OFFICINE MECCANICHE S.R.L., Busseto (PR) (IT)

(72) Inventor: Marco Laurini, Busseto (IT)

(73) Assignee: LAURINI OFFICINE MECCANICHE S.R.L., Busseto (IT)

( * ) Notice: Subject to any disclaimer, the term of this patent is extended or adjusted under 35 U.S.C. 154(b) by 0 days.

(21) Appl. No.: 15/113,124

(22) PCT Filed: Nov. 27, 2014

(86) PCT No.: PCT/IB2014/066400
§ 371 (c)(1),
(2) Date: Jul. 21, 2016

(87) PCT Pub. No.: WO2015/114422
PCT Pub. Date: Aug. 6, 2015

(65) Prior Publication Data
US 2017/0009908 A1 Jan. 12, 2017

(30) Foreign Application Priority Data

Jan. 29, 2014 (IT) .............................. PC2014A0002

(51) Int. Cl.
*F16L 1/036* (2006.01)
*F16L 1/032* (2006.01)
*E02F 5/10* (2006.01)

(52) U.S. Cl.
CPC ................ *F16L 1/036* (2013.01); *E02F 5/10* (2013.01); *F16L 1/032* (2013.01)

(58) Field of Classification Search
CPC ............ F16L 1/024; F16L 1/028; F16L 1/032
(Continued)

(56) References Cited

U.S. PATENT DOCUMENTS

| 2,559,703 A | 7/1951 | Bergman |
| 3,565,269 A * | 2/1971 | Martin .................... F16L 1/036 |
| | | 193/5 |

(Continued)

FOREIGN PATENT DOCUMENTS

| GB | 1 194 761 A | 6/1970 |
| GB | 1 537 968 A | 1/1979 |

(Continued)

OTHER PUBLICATIONS

International Search Report, dated Mar. 24, 2015, from corresponding PCT application.

*Primary Examiner* — Frederick L Lagman
(74) *Attorney, Agent, or Firm* — Young & Thompson

(57) ABSTRACT

A pipe laying machine for laying a pipe in a trench, includes a first self-propelled chassis (10) on which a driver's cab (11) and powertrain (12) are located, a beam (20) connected at a first end (20a) to the chassis and which extends laterally therefrom, a second moving chassis (30) connected at a second end (20b) of the beam and a guiding and supporting element (40) of a pipe, sliding on the beam toward and away from the self-propelled chassis, in which the self-propelled chassis can travel on a track (P) at the edge of the trench, the moving chassis (30) can travel on the bottom of the trench, and the guiding and supporting element can translate to carry the pipe to the trench so that by moving the machine forward along a direction of forward movement the cantilevered portion of pipe is laid on the bottom of the trench.

17 Claims, 11 Drawing Sheets

(58) Field of Classification Search
USPC .................................... 405/174, 184, 184.4
See application file for complete search history.

(56) References Cited

U.S. PATENT DOCUMENTS

| | | | |
|---|---|---|---|
| 3,938,669 A | | 2/1976 | Vinton |
| 3,956,901 A | * | 5/1976 | Brown ................... F16L 1/036 405/184.5 |
| 3,969,905 A | * | 7/1976 | Dolza ................... F16L 1/036 405/157 |
| 4,050,589 A | * | 9/1977 | Dolza ................... F16L 1/036 414/745.6 |
| 4,166,544 A | * | 9/1979 | Cecchi ................... F16L 1/032 212/239 |
| 4,452,550 A | * | 6/1984 | Hofmeester ............ F16L 1/032 405/158 |
| 4,549,060 A | * | 10/1985 | Paton ................. B23K 11/0073 219/59.1 |
| 5,332,110 A | | 7/1994 | Forsyth |
| 5,522,699 A | * | 6/1996 | Smith ..................... F16L 1/036 405/174 |
| 8,167,053 B2 | * | 5/2012 | Hendron ................... B66C 1/58 172/814 |
| 2003/0015488 A1 | | 1/2003 | Forsyth |
| 2008/0145151 A1 | * | 6/2008 | Rodrigue ................. H02G 1/06 405/184.4 |
| 2010/0108632 A1 | | 5/2010 | Davis |
| 2012/0003072 A1 | | 1/2012 | Laurini |
| 2014/0334881 A1 | * | 11/2014 | Darcy ..................... E02F 5/101 405/180 |

FOREIGN PATENT DOCUMENTS

| | | |
|---|---|---|
| WO | 2008/010033 A | 1/2008 |
| WO | 2009/045323 A1 | 4/2009 |

\* cited by examiner

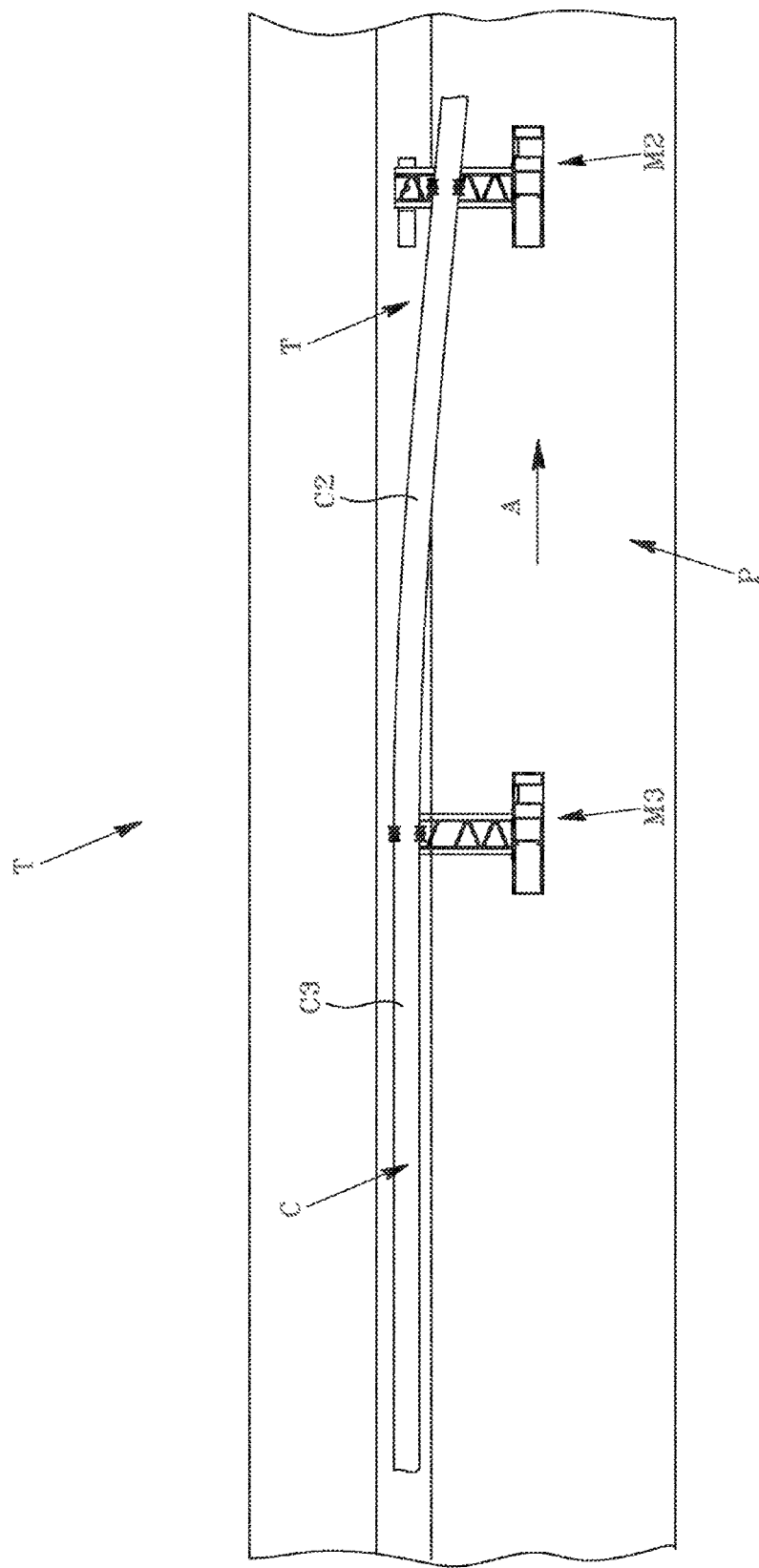

PIPE LAYING MACHINE AND PIPE LAYING METHOD

BACKGROUND OF THE INVENTION

Field of the Invention

The present invention relates to a pipe laying machine and to the related method for laying pipes in a trench.

The invention relates to the field of machinery used to lay medium or large pipes such as oil pipelines, gas pipelines or the like.

Typically, these pipes are assembled directly at the laying site, by welding different tubular sections arranged aligned with one another at the edge of a trench. After being assembled, a stretch of pipe of a given length (tens or hundreds of meters) is buried by placing it on the bottom of a trench, which will then be covered with backfill.

To handle the various sections of pipe, and to lay this pipe in the trench, machines known as pipe laying machines are generally used.

Description of the Related Art

Known pipe laying machines generally comprise a continuous track mounted frame, to which there is applied laterally a boom (or crane) that enables lifting and handling of the pipe. Devices with slings, cradles or the like are wrapped around the pipe to allow it to be gripped and lifted.

Example of these pipe laying machines are described in the patent applications US2003/015488A1, WO2009/045323, US2010/108632A1.

One of the main problems affecting machines of this type is related to the risk of overturning during the laying step when the pipe, which can weigh hundreds of tons, is in the position farthest from the center of gravity of the machine, generating the maximum overturning moment.

For these reasons, to lay a portion of pipe of large dimensions, several pipe laying machines positioned side by side are generally used (up to ten or even more), which lift and lay the pipe in the trench substantially simultaneously. This implies high costs both for the purchase or rental of a large number of machines, and for the use of a higher number of operators to drive them.

To increase the lifting capacity, some of these machines have been provided with appendages or counterweights that move away from the center of gravity of the machine, on the opposite side from the side on which the boom is positioned.

Pipe laying machines thus configured are described, for example, in U.S. Pat. No. 3,938,669A, U.S. Pat. No. 5,332,110A and WO2008/010033 (by the same applicant).

The load bearing capacity of these pipelayers, although greater due to the presence of the counterweights, is nonetheless limited and dependent on the overall dimensions of the machine that, due to problems linked to transport, generally cannot exceed given values.

For these reasons, in order to reduce the number of machines used, and consequently the costs of the work, the machines are often deliberately used beyond their load limits, thus increasing the risk of accidents caused by overturning.

Moreover, pipe laying operations performed with this system have other problems.

In fact, the simultaneous use of several pipe laying machines requires perfect synchronism of the commands imparted by the different operators to the booms during laying of the pipe in the trench. If this synchronism is missing, it is easy to trigger swinging movements of the pipe, which in turn generate dynamic forces capable of overturning the machine even when the static load limit is complied with. Therefore, lifting and laying operations must be performed with particularly slow movements, which affect the times required to complete the work.

Another limit of prior art pipe laying machines and of the related laying method, consists in the fact of having to move very large suspended loads in the vicinity of workers on the ground, who are required to direct and control correct positioning of the pipe in the trench.

Finally, these prior art machines require considerable space on the track at the edge of the trench both in order to pick up the pipe from the ground and for normal travel.

BRIEF SUMMARY OF THE INVENTION

In this context, the object of the present invention is to propose a pipe laying machine, and related method for laying pipes in a trench, that overcomes the problems of the prior art mentioned above.

In particular, an object of the present invention is to propose a pipe laying machines that allows pipes of large dimensions and great weight to be laid in greater safety with respect to prior art machines.

More in detail, an object of the present invention is to provide a pipe laying machine that can be loaded to a greater extent with respect to a prior art machine, without the risk of overturning or of sustaining other accidents.

Another object of the present invention is to produce a pipe laying machine that is simple to manage and control during the laying operation.

A further object of the present invention is to produce a pipe laying machine that can easily operate on tracks, at the side of trenches, of limited width.

Yet another object of the present invention is to propose a method for laying pipes that allows, with equal loads, a decrease in the number of machines employed with respect to prior art laying methods.

One more object of the present invention is to propose a method for laying pipes that allows a decrease in the laying time, and consequently in the costs of the work.

Finally, an object of the present invention is to increase the safety in the construction site by reducing handling of suspended loads.

The objects indicated above are achieved by the pipe laying machine of the present invention, which comprises:
- a first self-propelled chassis on which a driver's cab and a powertrain are located;
- a beam connected at a first end to said chassis and which extends laterally therefrom;
- a second moving chassis connected at a second end of said beam; and
- a guiding and supporting element of a pipe, sliding on said beam toward and away from said self-propelled chassis;

wherein said self-propelled chassis can travel on a track at the edge of said trench, said moving chassis can travel on the bottom of said trench, and said guiding and supporting element can translate to carry the pipe to said trench so that by moving the machine forward along a direction of forward movement the cantilevered portion of pipe projecting from the guiding and supporting element is laid on the bottom of the trench.

In one aspect of the invention, the guiding and supporting element comprises a cradle that partly surrounds the pipe defining a supporting area thereof.

Preferably, in another aspect of the invention, the cradle, at the supporting area, is provided with rollers configured to slide in contact with the surface of the pipe.

In another aspect of the invention, said cradle is mounted on the beam by means of a carriage, there being provided guiding means and actuator means adapted to translate said carriage on said beam.

In a further aspect of the invention, this beam is connected to the self-propelled chassis in a manner sliding vertically by means of slides.

In another aspect of the invention, the moving chassis can translate at least in a vertical direction with respect to said beam.

In a further aspect of the invention, said moving chassis is connected to the beam by means of a swinging arm, there being provided actuators to control the movement thereof.

In another aspect of the invention, according to any one of the preceding claims, said moving chassis is provided with drive means, for example a continuous track.

In yet another aspect of the invention, the beam is connected to the self-propelled chassis so as to be able to rotate about a substantially vertical axis. The beam can therefore move from an operating position, in which it projects substantially perpendicularly from the self-propelled chassis, toward a transport position, in which the beam is substantially side by side with the chassis.

The objects set are also achieved with a method for laying a pipe in a trench according to the invention, which comprises at least the following steps consisting in:

positioning two or more guiding and supporting elements under the pipe at a predetermined distance from one another, wherein the last guiding and supporting element is closer to the head of said pipe;

raising said guiding and supporting elements until they are in contact with the pipe to support it;

translating the last guiding and supporting element in a transverse direction with respect to the direction of forward movement until said supporting element is over the trench;

moving said guiding and supporting elements forward in the direction of forward movement making them slide with respect to the axis of the pipe;

so that the cantilevered portion of the pipe that projects beyond said last guiding and supporting element is elastically deformed so as to be laid on the bottom of the trench.

In one aspect of the invention, said guiding and supporting elements slide resting on a beam supported above the trench.

In another aspect of the invention, the guiding and supporting element is translated along the axis of the pipe by means of a first self-propelled chassis connected to a first end of the beam and by means of a second moving chassis connected to a second end of said beam.

In a further aspect of the invention, after having raised the guiding and supporting elements, the pipe is clamped in said guiding and supporting elements.

More in detail, in the aforesaid step at least one jaw is carried against the surface of the pipe.

In yet another aspect of the invention, the guiding and supporting elements are rotated about a substantially vertical or horizontal axis, to adapt them to the direction of the axis of the pipe during the laying operation.

BRIEF DESCRIPTION OF THE DRAWINGS

Further characteristics and advantages of the present invention will be more apparent from the description of a preferred, but not exclusive, embodiment of a pipe laying machine, as illustrated in the accompanying figures, wherein:

FIGS. 6a to 6d are further plan views illustrating the steps of laying a pipe in a trench according to the method of the invention;

DETAILED DESCRIPTION OF THE PREFERRED EMBODIMENTS

Figure 1:
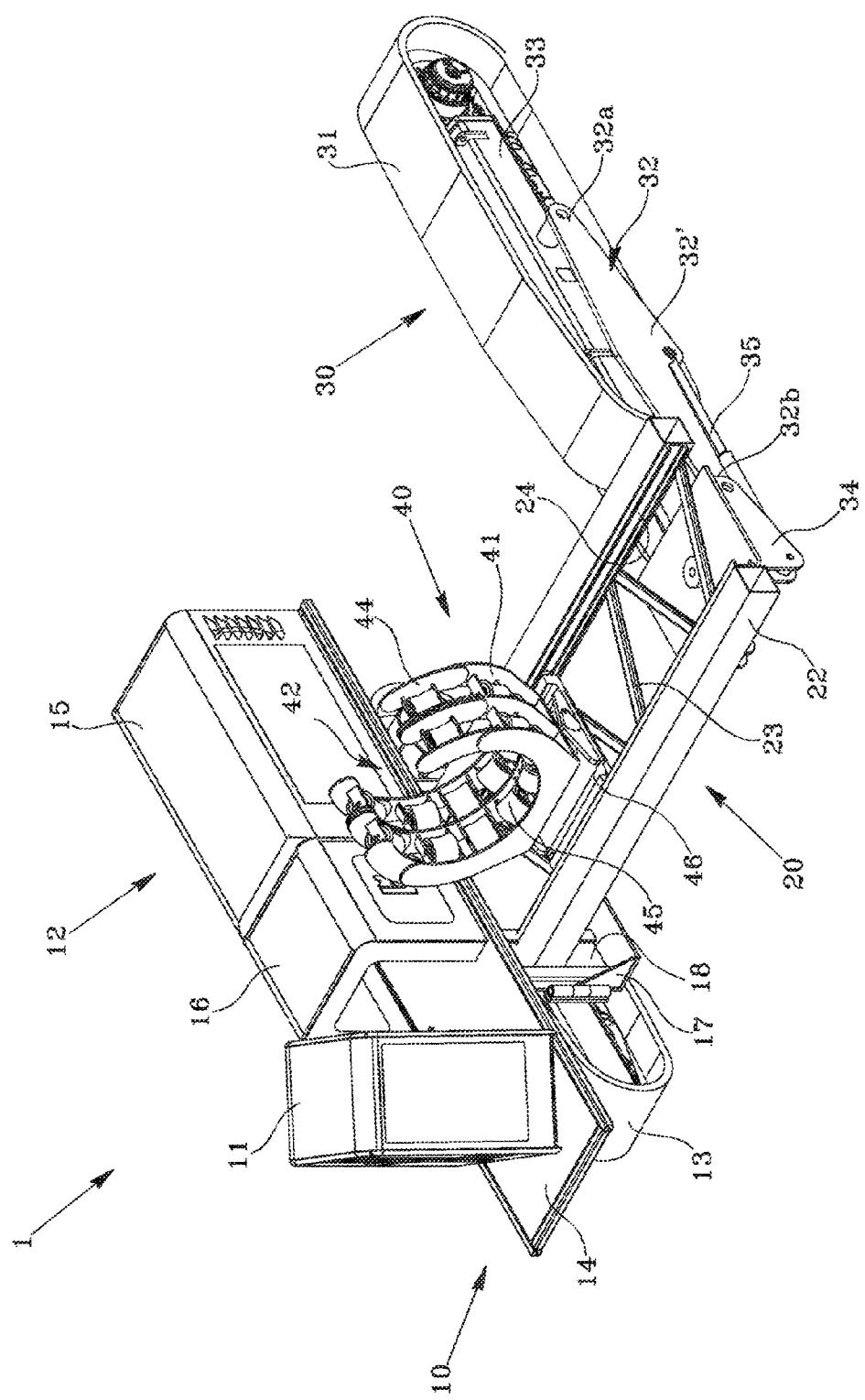
FIG. 1 is a perspective view of the pipe laying machine according to the invention.
Figure 2:
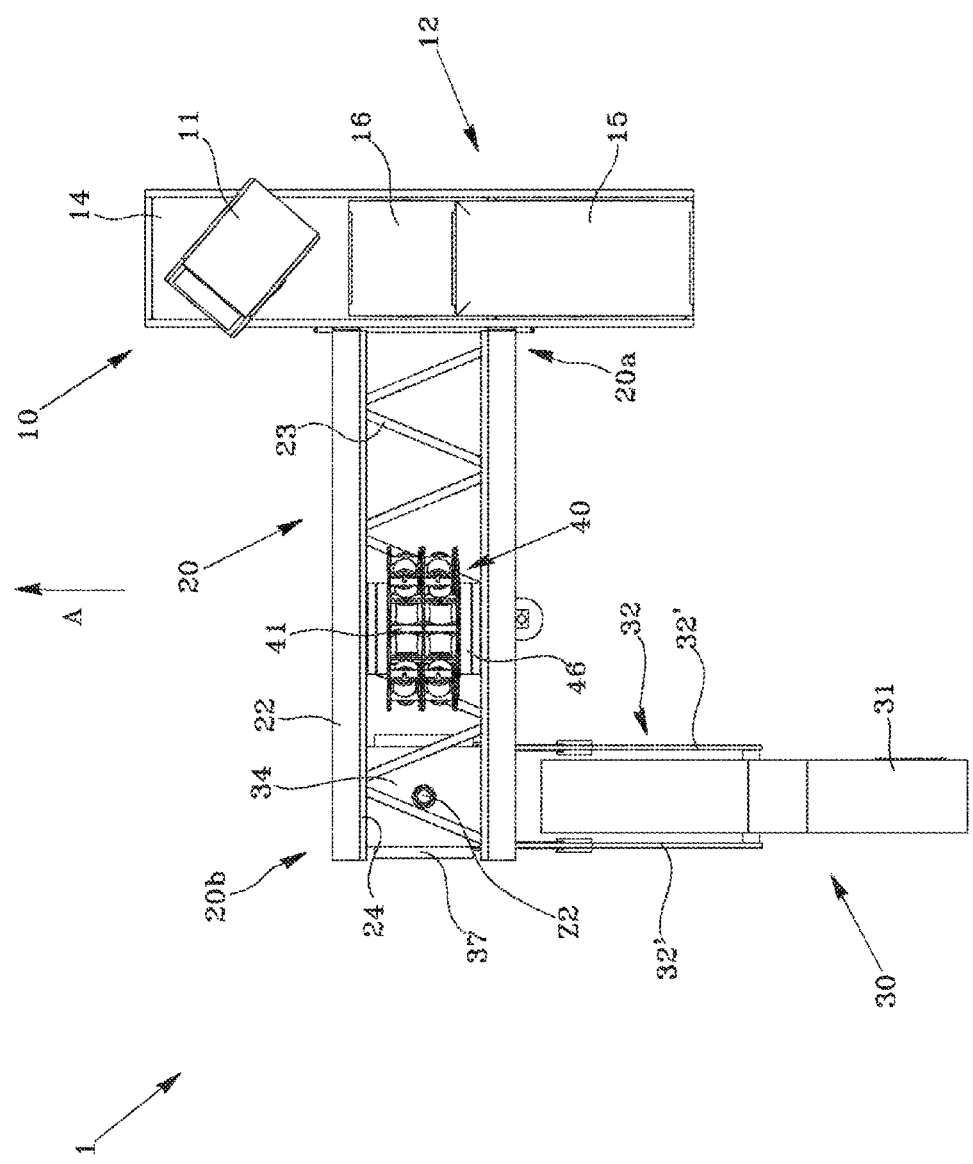
FIG. 2 is a plan view of the pipe laying machine of FIG. 1.

With reference to the accompanying figures, the pipe laying machine 1 comprises a self-propelled chassis, indicated as a whole with 10, on which a driver's cab 11 is installed. Said self-propelled chassis 10 is moved in a direction of forward movement A by a powertrain 12, preferably by means of at least one continuous track 13 or, alternatively, by means of wheels or other rolling means suitable for rough ground and/or with reduced adhesion (soil, mud, etc.).

According to a preferred aspect of the invention, the driver's cab 11 and the powertrain 12 are mounted on a platform 14, in turn supported by said continuous track 13. The driver's cab 11 is preferably connected to said platform 14 by means of a fifth wheel (not visible in the figure) that allows a rotation about a vertical axis so that the operator can face the direction of forward movement A and the trench in which the pipe is laid.

According to the invention, the powertrain 12 can include an endothermic engine 15 connected to a hydraulic unit 16, which in turn comprises the various devices (hydraulic pumps, valves, etc.) required to feed a hydraulic fluid toward the actuators of the machine (hydraulic cylinders, hydraulic motors, etc.).

Advantageously, said endothermic engine 15 can be coupled removably to the hydraulic unit 16 so as to be easily replaced with another motor both in the event of a fault and, for example, to adapt the machine to the standards of the country in which it is operating (emissions, noise, etc.)

To facilitate installation and removal, said endothermic engine 15 is provided in a casing, preferably sound-proofed, mounted on the platform 14 and can be connected to the hydraulic unit 16 by means of a cardan shaft or the like.

In an aspect of the invention, there is provided at least one beam 20 connected, fixed or movably, to the self-propelled chassis 10 and projecting laterally therefrom.

More in detail, said beam 20 can be made integral with the platform 14 or with the continuous track 13 or, alternatively, can be connected to these elements so as to be able to rotate about a substantially vertical or horizontal axis with respect to the ground.

Figure 3:
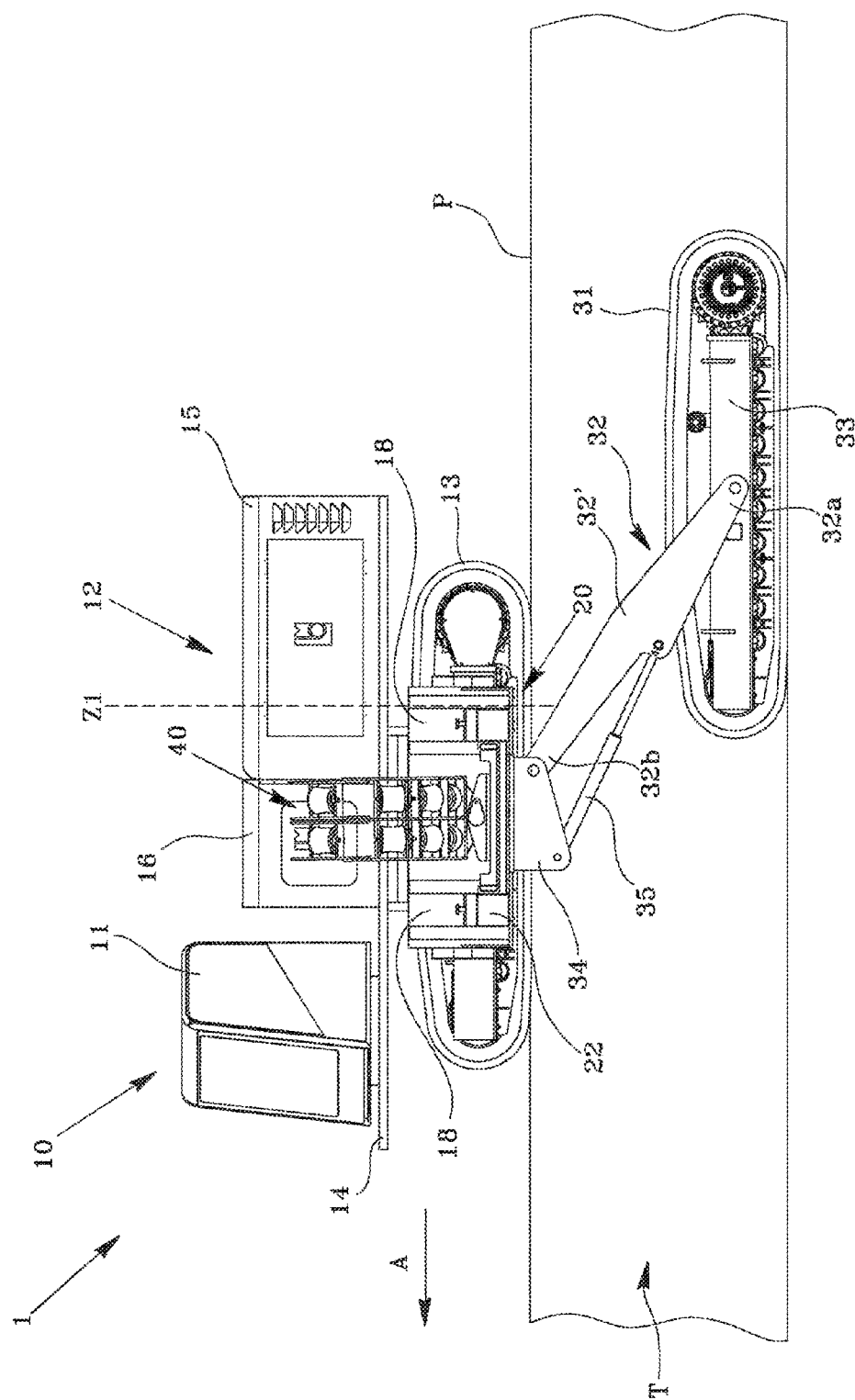
FIG. 3 is a side view of the pipe laying machine according to the invention, in which the moving chassis is positioned on the bottom of a trench.

In a preferred variant, the beam 20 is connected to the self-propelled chassis 10 through a pivot element 17 configured to rotate said beam about a substantially vertical axis Z1 (FIG. 3).

Figure 5:
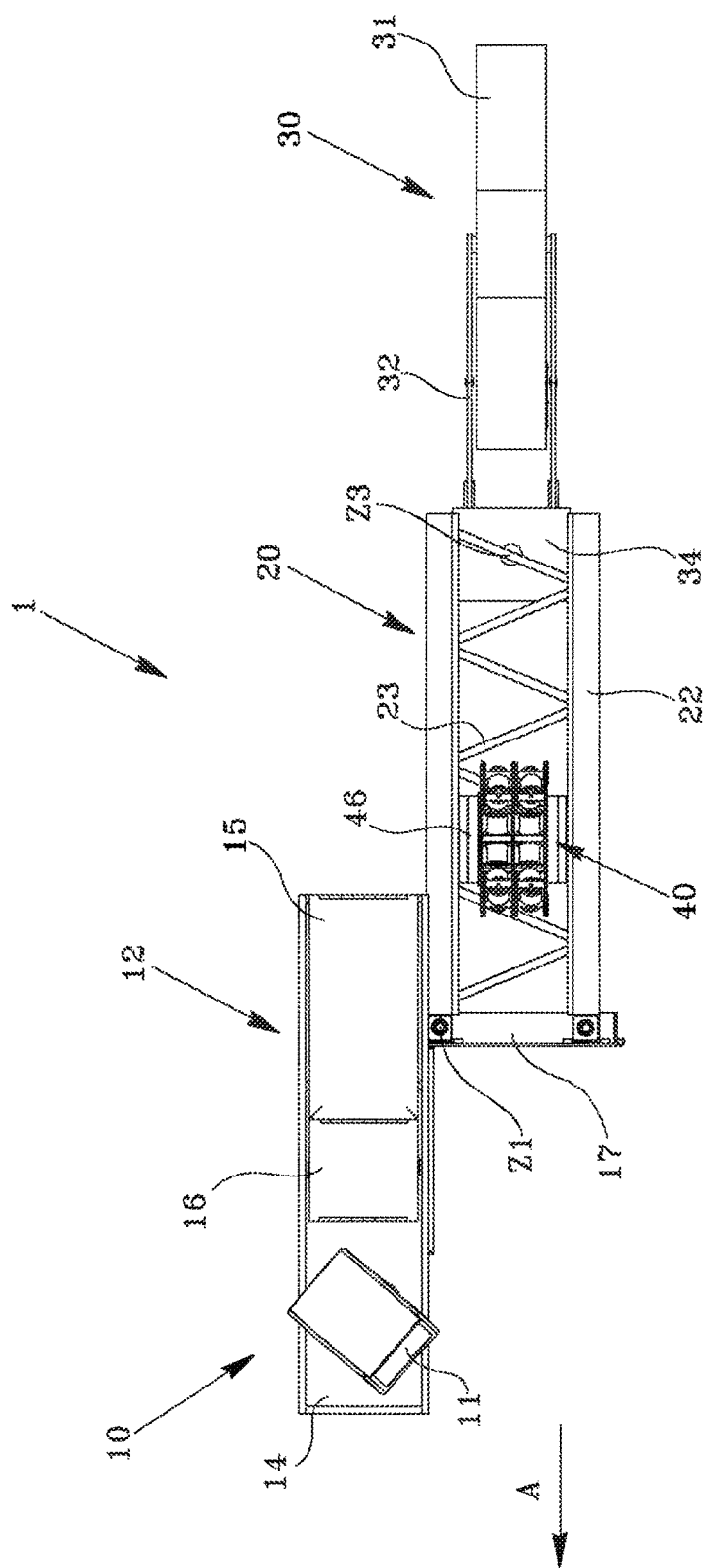
FIG. 5 is a plan view of the pipe laying machine according to the invention, in transport or handling configuration.

Said pivot element 17 can be blocked in an operating position in which the beam projects substantially perpendicularly from the self-propelled chassis 10 (FIG. 1) and released to allow the beam to rotate toward a transport position in which it is substantially side by side with said chassis (FIG. 5).

Advantageously, the beam can be connected to the pivot element 17 by means of slides 18, or the like, which allow it to translate vertically with respect to the self-propelled chassis 10.

In a preferred embodiment, said beam 20 includes a pair of profiles 22 arranged side by side on the same plane, joined by transverse elements 23.

The length of the beam 20 can vary, as will be more apparent below, both as a function of the dimensions of the pipe and of the width of the track along the side of the trench; typically the length of the beam is between 3 and 10 meters.

According to the invention, at the opposite end 20b there is provided a moving chassis 30, adapted to support said beam 20 both in the free forward movement of the machine and during laying of the pipe. The moving chassis 30 is thus configured to move integral with the self-propelled chassis 10, acting as further support on the ground to give stability to the machine. Said moving chassis 30 is provided with drive means, such as hydraulic motors or the like.

According to a preferred variant, said moving chassis 30 includes at least one continuous track 31, but could alternatively be provided with equivalent means that allow it to move on rough ground.

According to the invention, said moving chassis 30 can move at least in a vertical direction with respect to beam 20, so as to vary its bearing plane with respect to that of the self-propelled chassis 10.

Due to this feature, the pipe laying machine can either travel on a level plane with the self-propelled chassis 10 and the moving chassis 30, i.e. with the parts 10 and 30 positioned at the same level, or move forward on different levels, for example when traveling in the vicinity of a trench T, with the self-propelled chassis 10 traveling on the track P at the edge of the trench, and the moving chassis 30 traveling on the bottom of this trench (FIG. 3).

For this purpose, according to a possible variant, the moving chassis 30 is connected to the beam 20 by a swinging arm 32. In detail, said swinging arm 32 can include one or more rods 32' pivoted at one end to said beam 20 and at the opposite end to said moving chassis 30. Said rods 32' are, for example, pivoted at a first end 32a to the chassis 33 of the continuous track 31 and at a second end 32b to a plate 34 connected to an end 20b of the beam 20.

Swinging of the arm 32, i.e. rotation thereof in the pivot points, allows variation of the position in height of the moving chassis 30 with respect to the self-propelled chassis 10.

To control swinging of the arm 32, and therefore to lift or lower the moving chassis 30, there are provided actuators 35, preferably hydraulic, connected at one end to the plate 34 and at the opposite end to the arm 32 or to the chassis 33 of the continuous track 31.

When the moving chassis 30 is on the ground, said actuators 35 can also be used to translate the beam 20 vertically with respect to the self-propelled chassis 10.

In a preferred variant, the plate 34 is pivoted to the end 20b of the beam 20 on a substantially vertical axis Z2. In this way, when the beam 20 is rotated about the axis Z1 and moved toward the self-propelled chassis 10 (FIG. 5), the continuous track 31 can remain parallel to the direction of forward movement A. This allows a reduction in the lateral dimensions of the machine so that it can travel in areas with limited spaces, for example along tracks at the edge of trenches.

According to the invention, the machine also comprises a guiding and supporting element for a pipe, indicated as a whole with 40, configured to translate on the beam 20 toward and away from the self-propelled chassis 10.

In an embodiment, said guiding and supporting element 40 comprises at least one cradle 41 configured to support the pipe resting against it, at least partly surrounding the outer surface thereof.

More in detail, said cradle 41 includes a frame with a housing 42 defined by a supporting area 43 with a profile that is at least partly circular and, preferably, with an amplitude substantially equal to or less than 180 degrees. This allows said cradle to receive the pipe in the housing 42 with a relative movement along a vertical direction.

To allow the supporting element 40 to guide the pipe during the laying operation, and therefore to make said supporting element 40 slide along the axis of the pipe, the cradle 41 is provided with a plurality of rollers 45 positioned circumferentially in the supporting area 43.

Advantageously, these rollers 45 are arranged so that their outer surfaces lie on a circular arc having the same radius as the pipe to be laid, so that the weight of this latter is divided between all the rollers. The rollers can be made of metal and are preferably coated with a plastic material, such as polyurethane or the like.

In a preferred variant, said cradle 41 is also provided with at least one jaw or, preferably, a pair of jaws 44 adapted to clamp the pipe and maintain it positioned in the housing 42. Said jaws 44 are preferably pivoted on the cradle 41 and are moved by means of actuators (not shown) from an open position, in which they allow the pipe to occupy the housing 42 and rest against the rollers 45 to a position in which they surround it and maintain it in contact with said rollers.

As mentioned, the cradle 41 can slide on the beam 20 by means of a carriage 46, or a slide, provided with wheels 48 sliding inside guides 24 integral with the profiles 22.

Movement of the carriage 46 is controlled by means of one or more motors, preferably hydraulic, on the carriage, with pinions that mesh with racks integral with the profiles 22 of the beam 20.

Figure 4B:
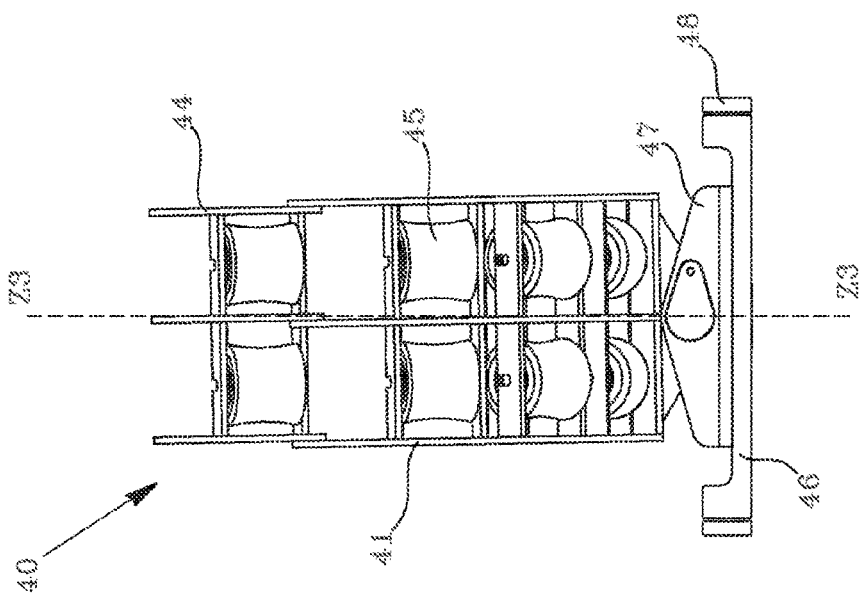
FIGS. 4a and 4b are respectively a front and side view of the guiding and supporting means according to the invention.
Figure 4A:
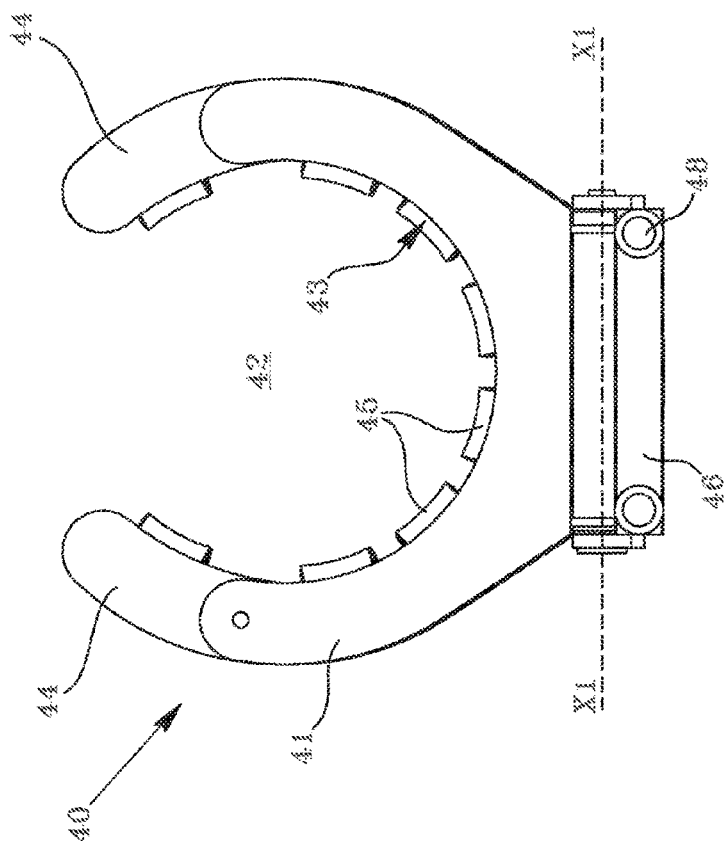

In an aspect of the invention, the cradle 41 can be connected to the carriage 46 by means of a swinging support 47 that allows the inclination of the same to be varied to adapt to the direction of the axis of the pipe during the laying operation. Said swinging support is configured to rotate the cradle 41 both around a substantially horizontal axis X1 perpendicular to the axis of the pipe and, preferably, also around a substantially vertical axis Z3 (FIG. 4b).

Operation of the pipe laying machine as described will be apparent hereinafter in the illustration of the laying steps, according to the method of the invention, with reference to FIGS. 6a to 6d.

Figure 6A:
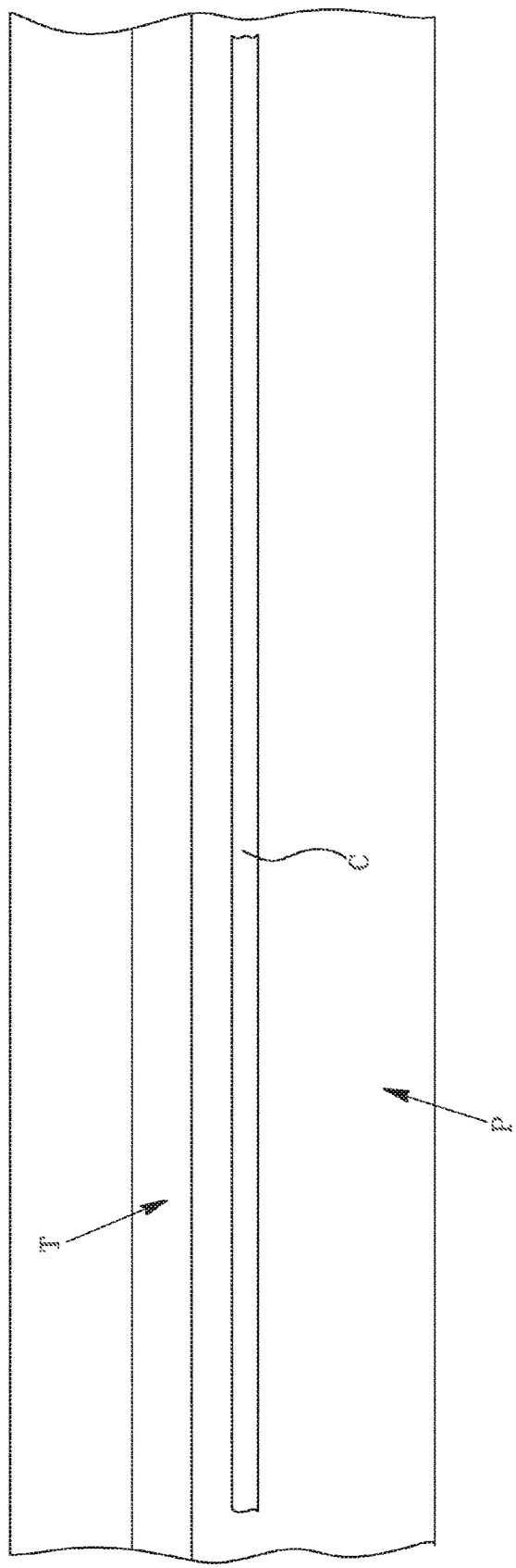

With reference to FIG. 6a, there is illustrated a portion of a worksite with a trench T on the bottom of which a pipe C must be laid. This pipe, after being joined, is positioned on the track P at the edge of the trench resting on mounts (not visible) that keep it raised off the ground. The height from the ground is generally between 50 and 150 cm.

In a first step at least two, but preferably three or more pipe laying machines M1, M2, M3 are moved forward in a direction of forward movement A, parallel to the axis of the trench T, with the self-propelled chassis 10 resting on the track P and the moving chassis 30 resting on the bottom of said trench.

Figure 6B:
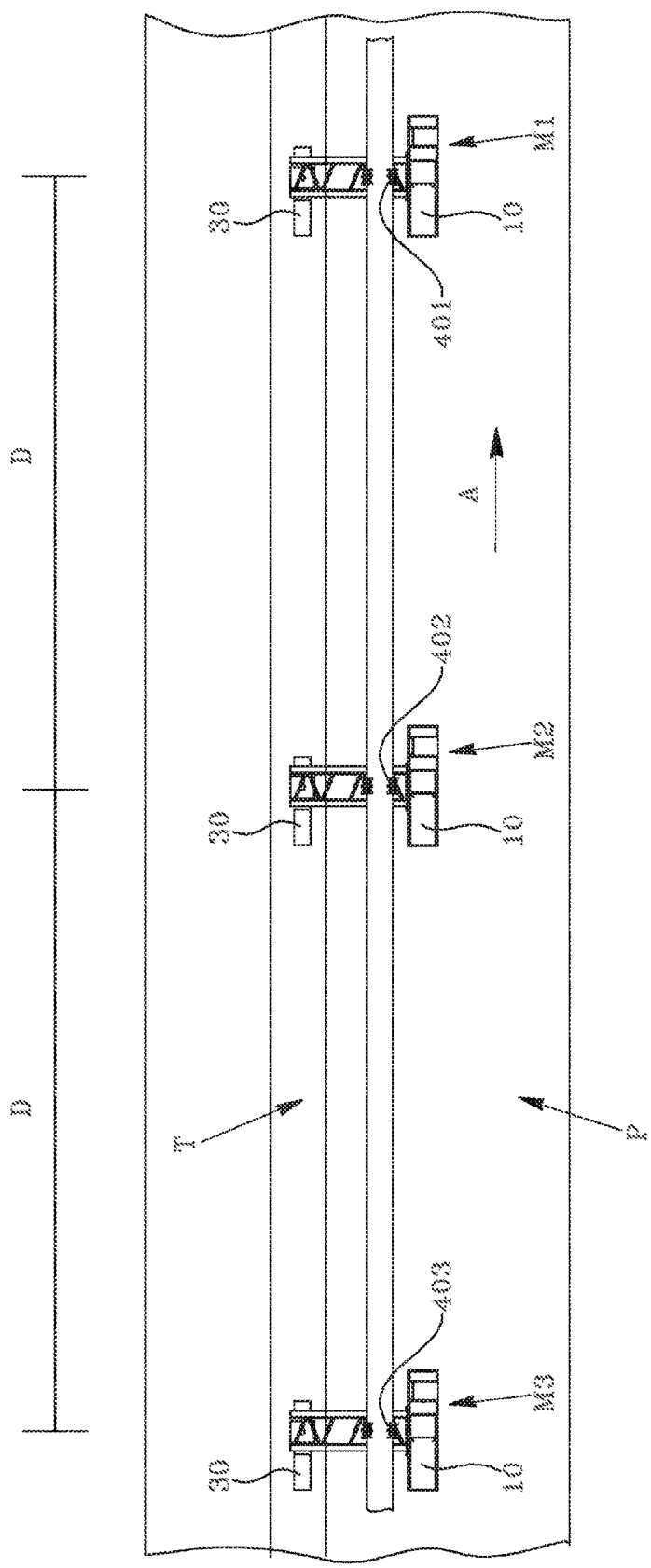

In this step the respective guiding and supporting elements 40-1, 40-2, 40-3 are aligned with the axis of the pipe C and, starting from the head of this latter, are moved along said axis until they are positioned at a given distance D from one another, as shown in FIG. 6b.

Both the number of machines, i.e. the number of guiding and supporting elements 40, and the maximum distance D between them, depends on various factors, such as the diameter of the pipe C, its weight and the elastic deformation capacity. In the example shown there are represented three machines, indicated respectively with M1, M2 and M3.

The last machine is generally positioned at the head of the pipe while the others precede it respectively by a predetermined distance D.

During forward movement and positioning, the guiding and supporting elements 40 are placed under the pipe C so that this latter is partly housed in the cradle 41, close to but not yet in contact therewith.

In detail, at least the first guiding and supporting element 40-1 of the first machine M1, after having been inserted around the pipe C, can be moved upward, until it comes into contact with the pipe and lifts it by a few centimeters. This allows the mounts below to be removed to allow the other machines behind to move forward freely.

Raising of the guiding and supporting element 40 is operated by means of the swinging arm 32 of the carriage, and of the related actuators, which push the beam 20, and consequently the cradle 41, upward.

The pipe C can also come into contact with the cradle 41 of the machines that follow due to the deformation curve taken as the first machine M1 moves forward on the track at the edge of the trench T.

When all the machines M1, M2, M3 are in position at the correct distance D from one another, the remaining guiding and supporting elements 40-1, 40-2, 40-3 are raised to the same level as the first, so as to support the pipe C.

If the cradles 41 are provided with jaws 44, these can be clamped before positioning of the guiding and supporting elements along the pipe or, preferably, after the raising step has terminated.

At this point, the guiding and supporting element 40-3 of the last machine M3 is moved laterally on the beam 20 until it is over the trench T, substantially aligned with its axis.

In this way, the pipe C takes a lateral deformation with a front stretch C1 remaining substantially aligned on the track P and a second stretch C2, between the first guiding and supporting element of the machine M1 and that of the last machine M3, arranged transversely between the track P and the central axis of the trench T.

Figure 6C:
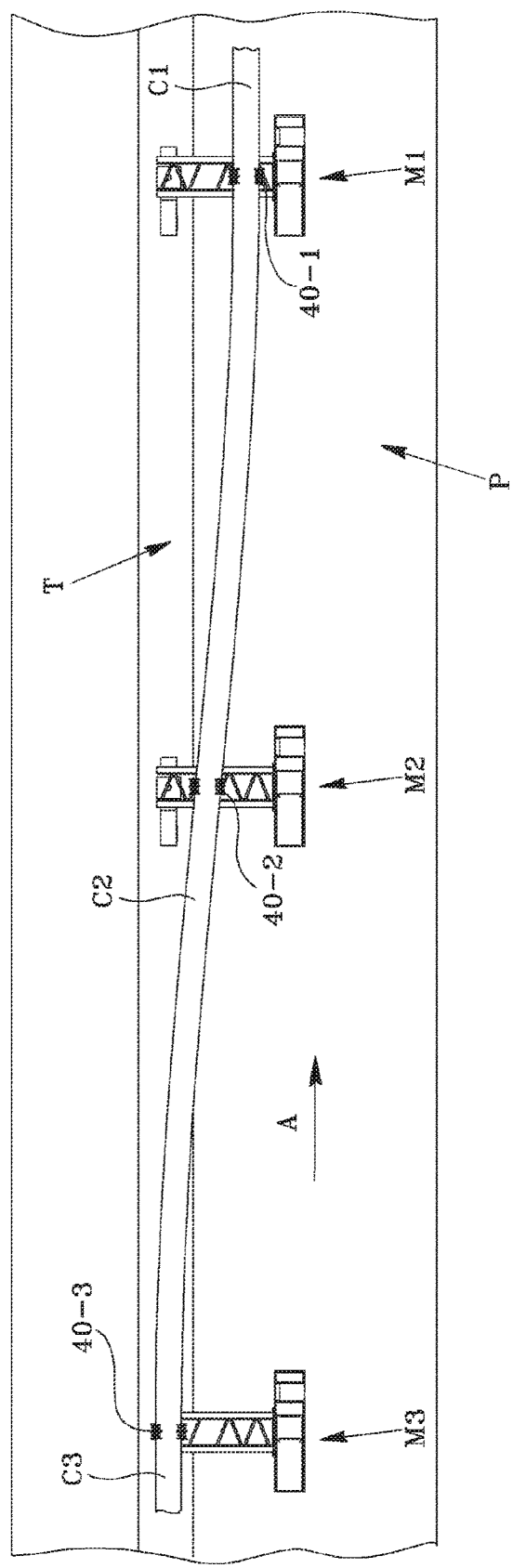

Simultaneously, any further guiding and supporting elements 40 interposed between the first and the last, are translated laterally toward the trench so that said stretch of pipe C2 remains substantially inside the elastic deformation curve, as can be seen in FIG. 6c.

After this step has terminated the machines are moved forward at the same speed as one another so that the guiding and supporting elements 40 are moved along the direction of forward movement A maintaining the distance D between them constant.

Figure 7:
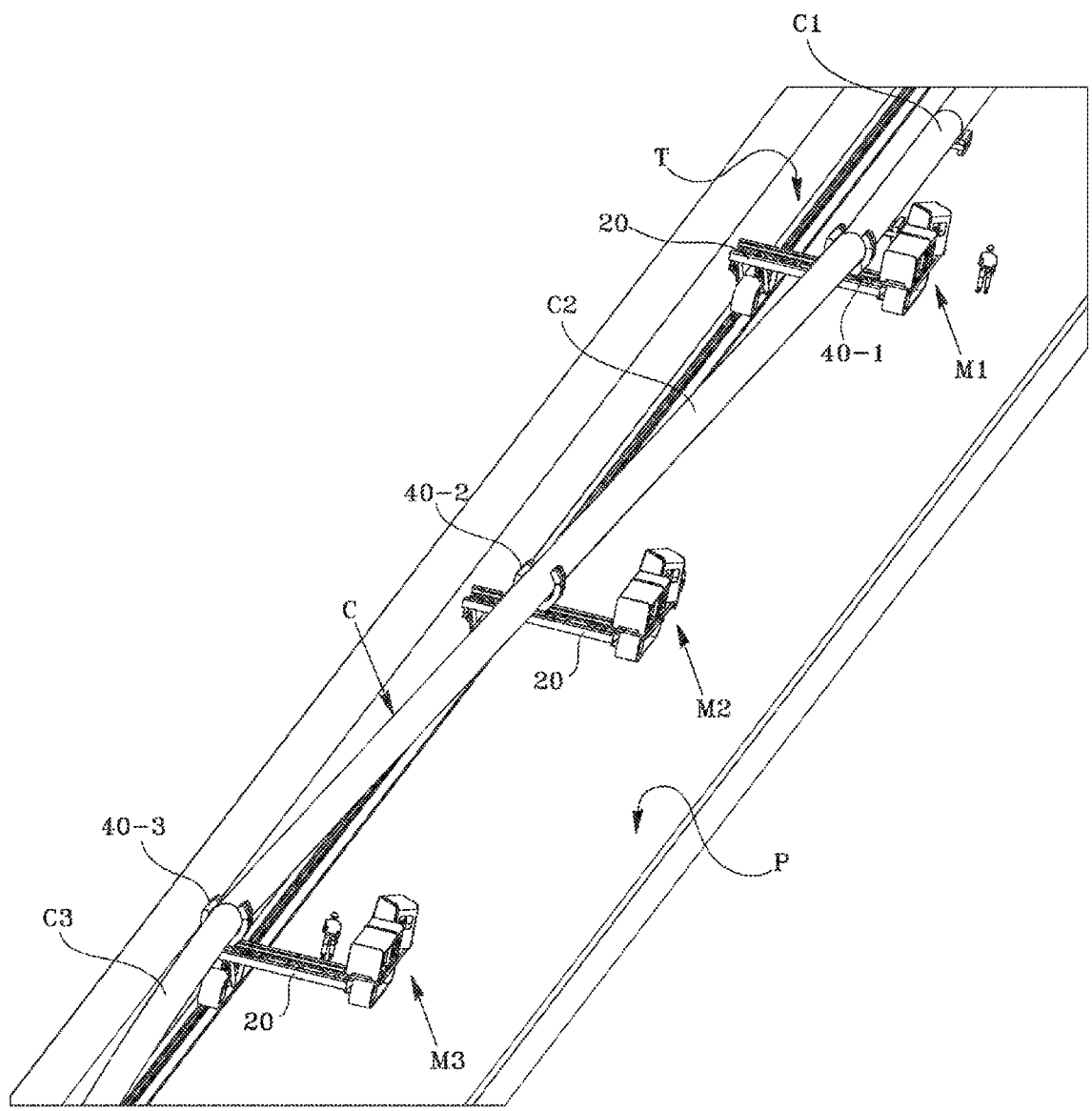
FIG. 7 is a perspective view of a step of laying a pipe according to the invention.
Figure 8:
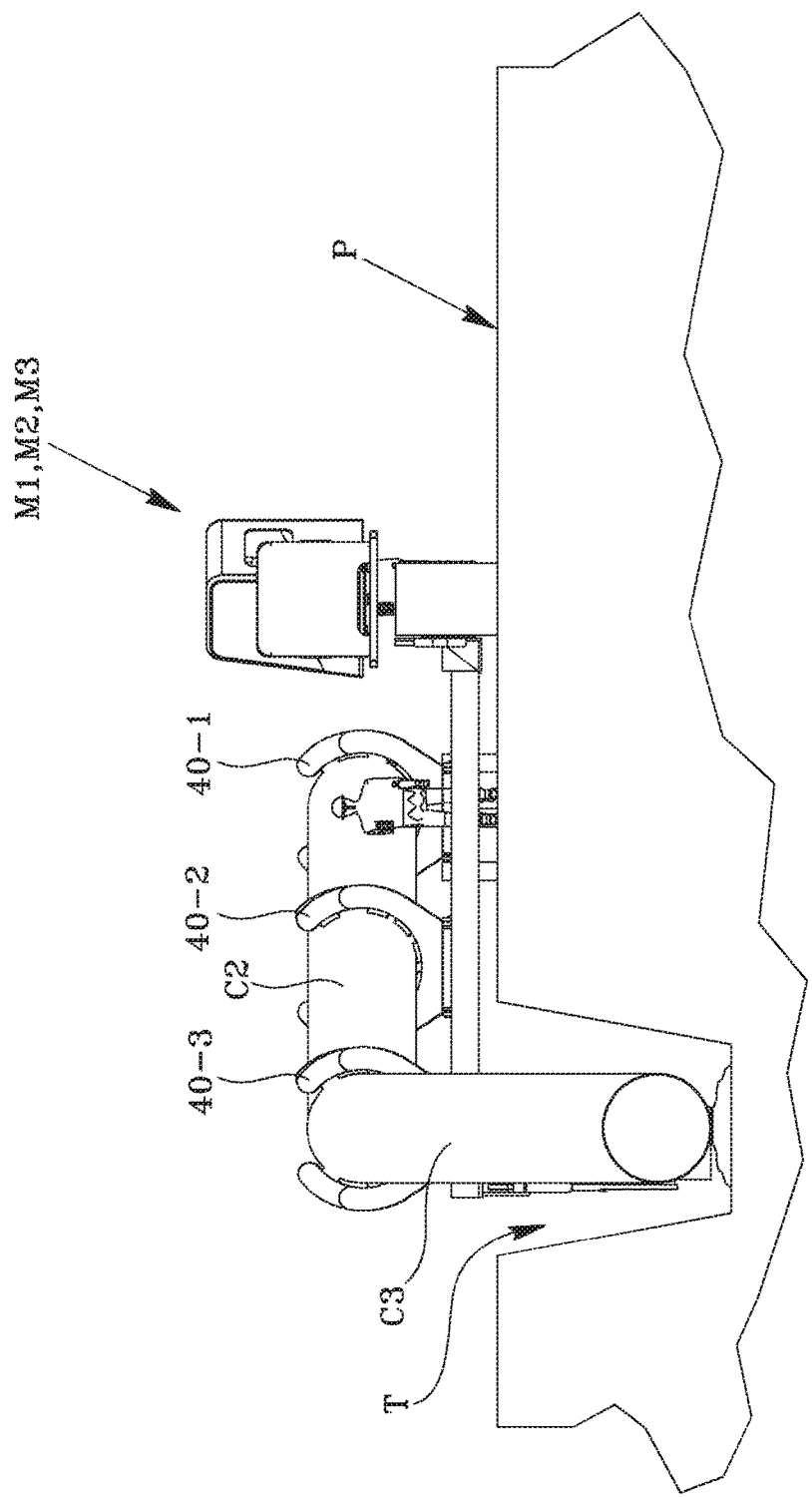
FIG. 8 is a sectional view of a trench in a step of laying a pipe according to the invention.

During forward movement the pipe C slides on said guiding and supporting elements so that the cantilevered portion of pipe C3 that remains behind the last machine M3 is gradually laid on the bottom of the trench due to the elastic deformation of the pipe, as can be seen in FIGS. 6d, 7 and 8.

In this way, laying takes place continuously for the whole length of the pipe C prepared at the edge of the trench.

After the work has terminated the moving chassis 30 can be returned to the track P by rotating the beam 20 on the pivot element 17 and simultaneously raising said moving chassis 30 by means of the swinging arm 32 until reaching a compact configuration shown in FIG. 5.

According to the invention, the machine can be designed so that it can be easily disassembled and assembled so as to be transported in standard containers suitable both for land and sea transport. The machine can be separated at least in the main parts, such as on the one hand the platform 14 together with the driver's cab 11 and the powertrain 12, and separately the continuous track 13, the beam 20, the cradle 41, the swinging arm 32 and the continuous track 31.

According to calculations and tests carried out by the applicant, these elements can be easily placed in an open container of standard size to be transported by road and/or by sea, overcoming the problems that instead affect prior art pipe laying machines.

As will be apparent from the description above, the present invention solves the problems that affect prior art machines, achieving the set objects.

In detail, the configuration of the pipe laying machine according to the invention provides for handling of the pipe between two stable supporting points, completely eliminating the risk of overturning.

This allows a much greater weight to be loaded onto the single machine, thereby reducing the total number of machines required, with considerable economic advantages.

Moreover, due to the particular structure of the supporting means, there are no hanging or potentially unstable loads that could cause danger to the operators on the ground in charge of the laying operations.

Another relevant advantage of the laying machine and method of the invention consists in the execution speed and above all in the possibility of laying the pipe continuously for the whole of its length only by moving the machines forward, without requiring to sling the pipe and then release it several times, as instead occurs in prior art systems.

The machines are also easier to drive, as operators only need to pay attention to the direction and to the speed of forward movement of the machine, contrary to prior art machines in which cranes with enormous overhanging loads must be moved.

The present invention, as described and illustrated, is susceptible to numerous modifications and variants, all falling within the scope of the inventive concept; moreover, all details can be replaced by other technically equivalent elements.

The invention claimed is:

1. A pipe laying machine for laying a pipe (C) in a trench (T), comprising:
   a first self-propelled chassis (10) on which a driver's cab (11) and a powertrain (12) are located;
   a beam (20) connected at a first end (20a) to said first self-propelled chassis (10) and which extends laterally therefrom;
   a second moving chassis (30) connected at a second end (20b) of said beam (20); and
   a guiding and supporting element (40) of a pipe, sliding on said beam (20) toward and away from said first self-propelled chassis (10);

wherein said first self-propelled chassis (10) can travel on a track (P) at the edge of said trench (T), said second moving chassis (30) can travel on the bottom of said trench (T), and said guiding and supporting element (40) can translate to carry the pipe (C) to said trench (T) so that by moving the machine forward along a direction of forward movement (A) a cantilevered portion of pipe is laid on the bottom of the trench, wherein said second moving chassis (30) is connected to the beam (20) by means of a swinging arm (32), there being provided actuators (35) to control the movement thereof.

2. The pipe laying machine according to claim 1, wherein the guiding and supporting element (40) comprises a cradle (41) that partly surrounds the pipe defining a supporting area (43) thereof.

3. The pipe laying machine according to claim 2, wherein the cradle (41) at the supporting area (43) is provided with rollers (45) configured to slide in contact with the surface of the pipe (C).

4. The pipe laying machine according to claim 3, wherein the cradle (41) is mounted on the beam (20) by means of a carriage (46), there being provided guide means (24) and actuator means adapted to translate said carriage on said beam (20).

5. The pipe laying machine according to claim 2, wherein the cradle (41) is mounted on the beam (20) by means of a carriage (46), there being provided guide means (24) and actuator means adapted to translate said carriage on said beam (20).

6. The pipe laying machine according to claim 2, wherein said second moving chassis (30) is provided with drive means.

7. The pipe laying machine according to claim 2, wherein said second moving chassis (30) comprises at least one continuous track (31).

8. The pipe laying machine according to claim 2, wherein said beam (20) is connected to the first self-propelled chassis (10) so as to be able to rotate about a substantially vertical axis (Z1) from an operating position in which it projects substantially perpendicularly from the first self-propelled chassis (10) toward a transport position in which it is substantially side by side therewith.

9. The pipe laying machine according to claim 2, wherein said second moving chassis (30) is pivoted to the beam (20) along a substantially vertical axis (Z2).

10. The pipe laying machine according to claim 1, wherein said second moving chassis (30) can translate at least in a vertical direction with respect to said beam (20).

11. The pipe laying machine according to claim 1, wherein said second moving chassis (30) is provided with drive means.

12. The pipe laying machine according to claim 1, wherein said second moving chassis (30) comprises at least one continuous track (31).

13. The pipe laying machine according to claim 1, wherein said beam (20) is connected to the first self-propelled chassis (10) so as to be able to rotate about a substantially vertical axis (Z1) from an operating position in which it projects substantially perpendicularly from the first self-propelled chassis (10) toward a transport position in which it is substantially side by side therewith.

14. The pipe laying machine according to claim 1, wherein said second moving chassis (30) is pivoted to the beam (20) along a substantially vertical axis (Z2).

15. A pipe laying machine for laying a pipe (C) in a trench (T), comprising:
  a first self-propelled chassis (10) on which a driver's cab (11) and a powertrain (12) are located;
  a beam (20) connected at a first end (20a) to said first self-propelled chassis (10) and which extends laterally therefrom;
  a second moving chassis (30) connected at a second end (20b) of said beam (20); and
  a guiding and supporting element (40) of a pipe, sliding on said beam (20) toward and away from said first self-propelled chassis (10);
  wherein said first self-propelled chassis (10) can travel on a track (P) at the edge of said trench (T), said second moving chassis (30) can travel on the bottom of said trench (T), and said guiding and supporting element (40) can translate to carry the pipe (C) to said trench (T) so that by moving the machine forward along a direction of forward movement (A) a cantilevered portion of pipe is laid on the bottom of the trench,
  wherein said beam (20) is connected to the first self-propelled chassis (10) in a manner sliding vertically by means of slides (18).

16. A method for laying a pipe (C) in a trench (T), wherein the pipe (C) is initially arranged at the edge of said trench (T), comprising at least the following steps consisting of:
  positioning two or more guiding and supporting elements (40-1, 40-2, 40-3) under the pipe (C) at a predetermined distance (D) from one another, wherein a last guiding and supporting element (40-3) is closer to a head of said pipe (C);
  raising said guiding and supporting elements (40-1, 40-2, 40-3) until they are in contact with the pipe (C) to support it;
  translating the last guiding and supporting element (40-3) in a transverse direction with respect to the direction of forward movement until said last supporting element (40-3) is over the trench (T);
  moving said guiding and supporting elements (40-1, 40-2, 40-3) in a direction of forward movement (A) making them slide with respect to the axis of the pipe (C);
  so that a cantilevered portion (C3) of the pipe (C) that projects beyond said last guiding and supporting element (40-3) is elastically deformed so as to be laid on the bottom of the trench (T).

17. The method according to claim 16, wherein there are employed at least three guiding and supporting elements (40-1, 40-2, 40-3), the guiding and supporting elements (40-2) interposed between said last guiding and supporting element (40-3) and a first guiding and supporting element (40-1) farthest from the head of the pipe (C) being arranged so that the stretch of pipe (C2) does not exceed the limit of elastic deformation thereof.

\* \* \* \* \*